United States Patent
Streicher

(10) Patent No.: US 6,514,050 B1
(45) Date of Patent: Feb. 4, 2003

(54) HIGH PRESSURE SEAL MEANS FOR A RADIAL PISTON PUMP

(75) Inventor: Bernd Streicher, Filderstadt (DE)

(73) Assignee: Robert Bosch GmbH, Stuttgart (DE)

(*) Notice: Subject to any disclaimer, the term of this patent is extended or adjusted under 35 U.S.C. 154(b) by 131 days.

(21) Appl. No.: 09/254,631
(22) PCT Filed: Jul. 2, 1998
(86) PCT No.: PCT/DE98/01829
§ 371 (c)(1), (2), (4) Date: Mar. 11, 1999
(87) PCT Pub. No.: WO99/02860
PCT Pub. Date: Jan. 21, 1999

(30) Foreign Application Priority Data

Jul. 11, 1997 (DE) .......................... 197 29 788

(51) Int. Cl.⁷ ................................ F04B 27/04
(52) U.S. Cl. .................. 417/273; 417/440; 277/626
(58) Field of Search ................ 417/273, 364, 417/545, 552, 559; 277/603, 607, 609, 614, 626, 630, 647, 642

(56) References Cited

U.S. PATENT DOCUMENTS

| | | | | |
|---|---|---|---|---|
| 3,501,158 A | * | 3/1970 | Tillman, III | 277/626 |
| 4,410,186 A | * | 10/1983 | Pierce, Jr. | 277/2 |
| 4,990,065 A | * | 2/1991 | Otaki | 417/273 |
| 5,121,947 A | * | 6/1992 | Lee, III et al. | 137/508 |
| 5,571,243 A | * | 11/1996 | Arnold et al. | 417/206 |
| 5,979,297 A | * | 11/1999 | Ricco | 417/273 |

* cited by examiner

Primary Examiner—Cheryl J. Tyler
(74) Attorney, Agent, or Firm—Ronald E. Greigg

(57) ABSTRACT

A radial piston pump for high-pressure fuel delivery in fuel injection systems of internal combustion engines, which includes a common rail injection system. The system includes a drive shaft that is supported in a pump housing and is embodied eccentrically for driving a number of pistons that are disposed radially in respective cylinder chambers into a reciprocating motion in the radial direction in the cylinder chambers upon rotation of the drive shaft. For each piston, a metallic housing part which constitutes the respective cylinder chamber is provided with a fuel intake opening and a fuel outlet opening which are controlled by intake and outlet valves. In order to uncouple the high-pressure sealing points from one another and to respectively define them in a statically exact fashion, the pump is embodied so that the housing part rests with a flat contact surface against a flat contact surface of the metallic housing base body. A projecting section of the housing part is oriented toward the drive shaft and extends through a radial opening of the housing base body in the direction toward the drive shaft. A fuel outlet opening discharges into the flat contact surface and is flush with a second outlet opening in the housing base body. A metallic high-pressure sealing element is provided in a widened mouth region of the fuel outlet opening in the housing part. The metallic high-pressure sealing element is tightened against the housing base body by way of screws in such a way that the high-pressure side is sealed through the clamping of the high-pressure sealing element.

21 Claims, 5 Drawing Sheets

HIGH PRESSURE SEAL MEANS FOR A RADIAL PISTON PUMP

PRIOR ART

The invention relates to a radial piston pump for high-pressure fuel delivery in fuel injection systems of internal combustion engines, particularly in a common rail injection system. A drive shaft is supported in a pump housing and is embodied as eccentric or has a number of cam-like projections in the circumference direction. Preferably the pump includes a number of pistons that are disposed radially with regard to the drive shaft, each in a respective cylinder chamber. Each piston can be set into a reciprocating motion in the radial direction in the cylinder chamber upon rotation of the drive shaft. Each piston is provided with a check valve on the intake side and on the high-pressure side, wherein for each piston, a metallic housing part, which constitutes the respective cylinder chamber, is provided with a fuel inlet opening and a fuel outlet opening.

In radial piston pumps of this kind, the housing part is supported and sealed in relation to other housing regions by a number of elastomer sealing elements. This leads to an indefinite arrangement of the components of the pump.

OBJECTS OF THE INVENTION

Based on this, an object of the current invention is to produce a radial piston pump that pumps a high pressure up to 2000 bar, in which the high-pressure-affected components and their sealing points uncoupled from each other and in the assembled state, are exactly defined statically.

This object is attained with a radial piston pump of the type described at the beginning, by virtue of the fact that the housing part rests with a flat contact surface against a flat contact surface of the metallic housing base body from the radial outside with regard to the drive shaft. A projecting section of the housing part, which is concentric to the cylinder chamber and is oriented toward the drive shaft, extends through a radial opening of the housing base body in the direction toward the drive shaft. The fuel outlet opening discharges into the flat contact surface and is flush with another outlet opening in the housing base body, and that a metallic high-pressure sealing element is provided in a widened mouth region of the fuel outlet opening in the housing part and/or the other outlet opening that is flush with it in the housing base body. The housing part, with the interposition of the metallic high-pressure sealing element, is tightened against the housing base body by way of screws in such a way that the high-pressure side is sealed through the clamping of the high-pressure sealing element.

ADVANTAGES OF THE INVENTION

Whereas in the previously known radial piston pump, the high-pressure seal was also achieved by way of interposed elastomer sealing elements, and the assembly of the components adjoining the high-pressure side—as mentioned at the beginning—included a flux of force over a number of components which led to a static indeterminacy. The invention proposes to produce the seal by way of the high-pressure sealing element and by virtue of the fact that the flat metallic contact surfaces of the respective radially outer housing part and the housing base body are tightened against each other. The housing part can rest in a statically defined manner against the housing base body by way of the flat contact surfaces. When the housing part is tightened against the housing base body, a so-called hard seal of the high-pressure side is produced by the metallic high-pressure sealing element, which connects the outlet opening in the housing part and the other outlet opening in the housing base body to each other so that they permit fuel to flow through and are sealed in relation to the outside.

The high-pressure-affected sealing points of metallic components that are tightened against each other could also be embodied without the interposition of additional high-pressure sealing elements. To this end, the surfaces of the metallic components that rest against each other in a sealed fashion could be machined, in particular lapped, in order to produce a desire flatness and surface roughness. Then a hard seal (metal against metal) can likewise be achieved by tightening the components against each other. If the lapping can only be carried out with difficulty or is altogether impossible because a relevant component has a protruding pin or the like, or if the processing step of the lapping needs to be eliminated, then a surface quality that is sufficient for producing a hard seal can also be produced by means of hard turning, i.e. metal-removing machining, after the heat hardening. If, however, in accordance with the current invention, a metallic high-pressure sealing element is used in the manner described, then the machining expense is much lower and the pump can therefore be manufactured in a more reasonably priced fashion. Furthermore, greater manufacturing tolerances in the housing part and in the housing base body are possible, without the occurrence of leaks.

According to a preferred embodiment of the invention, the high-pressure sealing element is a double-cone sealing element. The double cone sealing element is then preferably received in the widened mouth region of the fuel outlet opening in the housing part and/or in the housing base body in such a way that the circumference edges of the respective outlet opening rest in a sealed fashion against the conical surfaces of the double cone sealing element.

The widened mouth region can, for example, be provided in the form of a stepped bore in the housing base body or in the housing part. In this instance, the preferably right-angled step constitutes the above-mentioned circular edge, which can be placed against the conical sealing surface.

According to another embodiment of the invention, the high-pressure sealing element can be embodied as annular and can constitute a sealing cap.

It has further turned out to be advantageous if the high-pressure sealing element is embodied as essentially in the shape of a bushing and produces a hard seal with its end faces encompassing the high-pressure-carrying openings.

In a quite particularly advantageous improvement of the above-mentioned concept of the invention, the bushing-shaped high-pressure sealing element is embodied as resilient in the axial direction. This can be advantageously achieved by virtue of the fact that on its inner and/or outer surface, the bushing-shaped high-pressure sealing element has recesses that extend in the radial and the circumferential direction.

A particularly good and operationally reliable seal is achieved if an edged or bead-shaped circumferential projection is embodied on the end faces of the high-pressure sealing element. With bushing-shaped high-pressure sealing elements, this can be achieved, for example, by means of end faces that are slightly inclined in relation to the longitudinal direction, i.e. extend in a conical fashion.

In order to assure a correct assembly position, it has turned out to be advantageous that the protruding section of the housing part oriented toward the drive shaft forms a centering collar with which the housing part can be positioned in the radial opening of the housing base body.

In order to keep the unusable dead space in the compression stroke of the pump piston as small as possible and to thus increase the efficiency of the radial piston pump, it has turned out to be advantageous if the intake side check valve and the high-pressure side check valve are integrated into the respective housing part that constitutes the cylinder chamber.

The cylinder chamber could be embodied by a blind bore that extends radially outward in the housing part. In order to be able to machine the wall of the cylinder chamber in a suitable manner, e.g. to lap it, it has turned out to be advantageous, though, if the housing part has a through opening that extends radially in relation to the drive shaft, constitutes the cylinder chamber, and is sealed on the radial outside by a metallic sealing element that is screwed into the through opening.

In order to seal the through opening by means of the metallic sealing element, this element is advantageously tightened with its end face against an axial step in the through opening in such a way that a high-pressure-tight seal is achieved.

In another improvement of this concept of the invention, an edged or bead-shaped circumferential projection is embodied on the end face of the sealing element and this leads to a sealing, plastic deformation along the projection when the components are tightened against each other. The projection itself, however, is not deformed, but only produces the hard seal of the flat surfaces.

This seal, which is called the biting-edge technique, is not limited to the sealing of the radial through opening in the housing part that constitutes the cylinder chamber by means of the sealing element, but can also be used on other insertion parts, particularly parts that can be screwed in, e.g. the seal of an access opening to a check valve or a high-pressure fitting that can be screwed in.

Other features, details, and advantages of the invention ensue from the graphic representation of the subsequent description of a preferred embodiment of the radial piston pump according to the invention.

DETAILED DESCRIPTION

Figure 1:
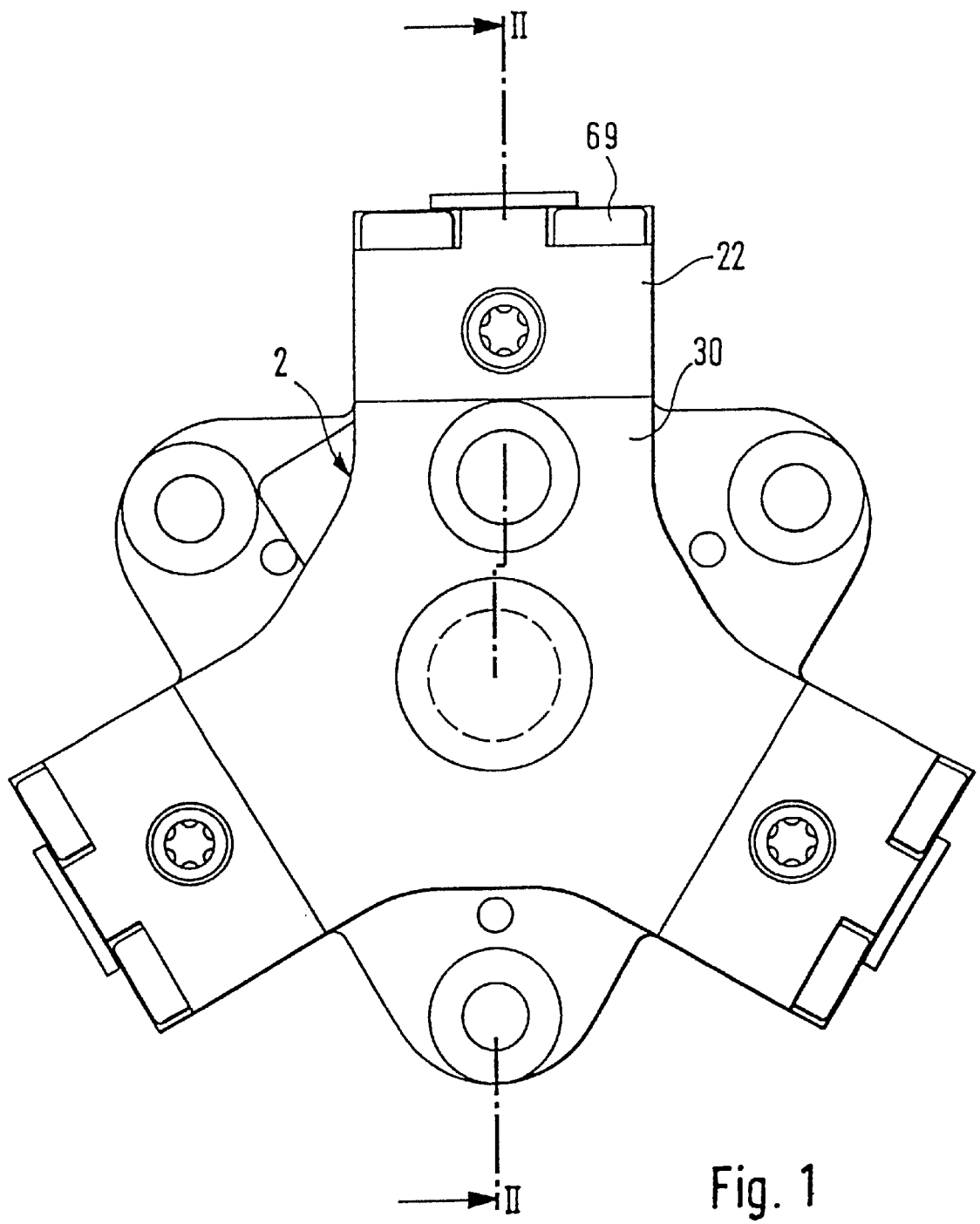
FIG. 1 is a top view of an embodiment of the radial piston pump according to the invention, in the direction of the drive shaft.
Figure 2:
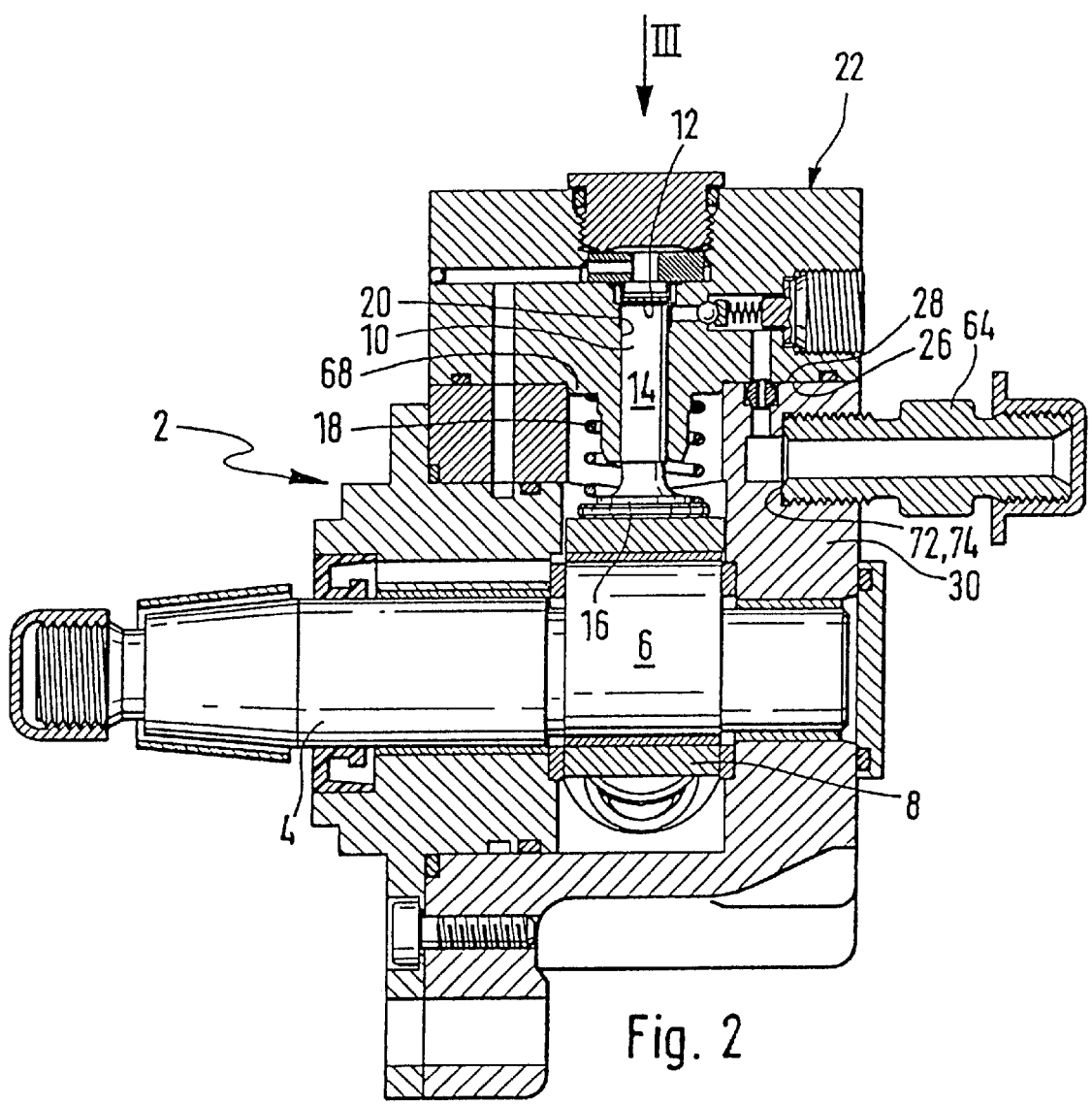
FIG. 2 is a longitudinal section along line II—II in FIG. 1.

FIGS. 1 and 2 show a radial piston pump for high-pressure fuel delivery in fuel injection systems,: particularly in common rail systems, of internal combustion engines. The radial piston pump is designed with an integrated on-demand quantity regulation. The principle of suction throttle regulation is followed as a regulation concept. The fuel delivery and dimensioning is executed by way of a metering unit, not shown.

The radial piston pump includes a drive shaft 4, which has an eccentrically embodied shaft section 6 and is supported in a pump housing that is identified as a unit with the reference numeral 2. A travel bushing 8 is provided on the eccentric shaft section 6 and can be rotated in relation to the shaft section 6. Three pistons 10 that are disposed offset from one another by 120° in the radial direction are supported against the outer circumference surface of the travel bushing 8, which can be embodied as cylindrical or polygonal. The pistons 10 include a tappet 14 that is guided in a cylinder chamber 12 and on the end of this tappet oriented toward the drive shaft 4, a disk-shaped contact section 16 is embodied, with which the respective piston 10 is supported against the outer circumference surface of the travel bushing 8, with the initial stress of a spring 18. The cylinder chamber 12 of each tappet 14 is constituted in a radially outer housing part 22 by a through opening 20 that extends radial to the drive shaft 4 and a pump piston 10 that can move radially in this through opening. The housing part 22 is essentially block-shaped and has a contact surface 26, which is oriented toward the drive shaft 4 and extends perpendicular to the longitudinal direction of the through opening 20, with which the housing part 22 rests against a likewise flat contact surface 28 of a housing base body 30, which surface is oriented radially outward away from the drive shaft 4.

A sealing element 32 that is embodied as a screw plug is screwed in a sealed fashion into a diametrically enlarged, radially outer end section 31 of the through opening 20. A disk-shaped element 38, which has a central opening 40 and at least one radial opening 42 leading from the central opening 40, is inserted between the end face 34 of the sealing element 32 and an axial step 36 in the through bore 20. The radial opening 42 communicates with fuel inlet openings 44 and 46 in the housing part 22, which discharges into the contact surface 26 of the housing part 22 and is flush with another inlet opening 47 in the housing base body 30. An intake side check valve 48 is provided on the side of the disk-shaped element 38 oriented toward the pump piston. It includes a cup-shaped support in which a compression spring is accommodated, which prestresses a disk-shaped valve body against the central opening 40 in the disk element 38.

Figure 3:
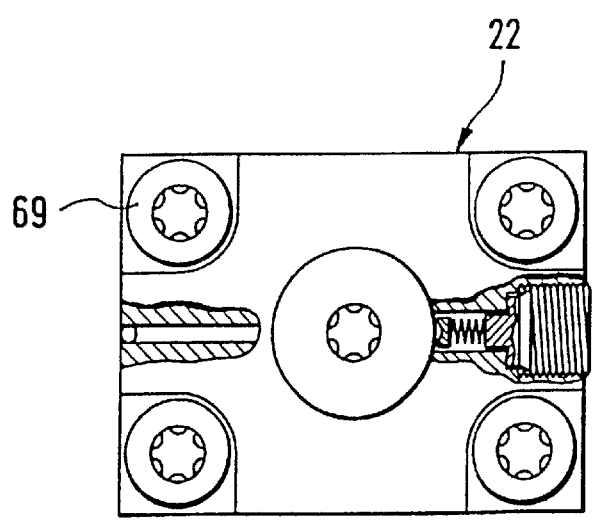
FIG. 3 is a top view of the radially outer housing part that constitutes a cylinder chamber, in the direction of the arrows III—III in FIG. 2.
Figure 4:
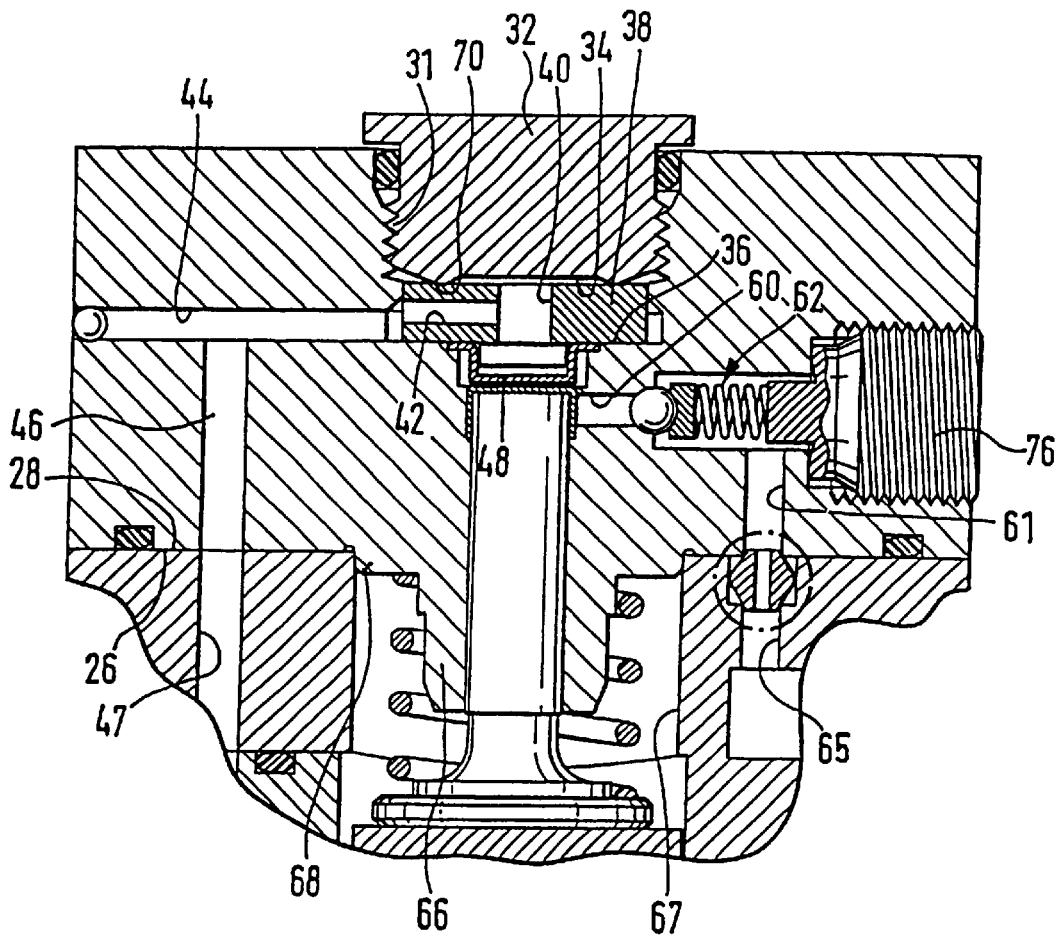
FIG. 4 is an enlarged depiction of a detail from FIG. 2, with a detailed depiction of a high-pressure sealing point.
Figure 4A:
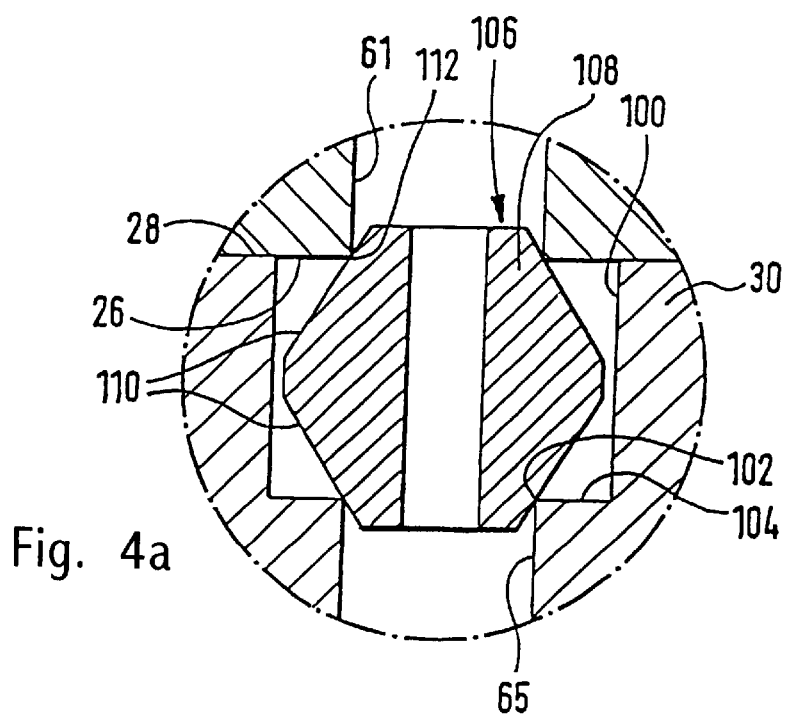
FIG. 4a illustrates an enlargement of the insert shown in FIG. 4 which illustrates a high pressure sealing point.

A fuel outlet opening 60 leads away from the cylinder chamber 12, has a high-pressure side check valve 62 accommodated in it, and leads into another fuel outlet opening 61, which likewise discharges into the contact surface 26 of the housing part 22 and is flush with another outlet opening 65 that leads to a high-pressure fitting 64. The outlet line 65 contains a widened mouth region 100 in the form of a stepped bore in the housing base body 30. The outlet opening 65 is thus encompassed by a circumferential edge 102 of the axial step 104. A high-pressure sealing element 106 in the form of a double cone sealing element 108 is inserted into the widened mouth region 100. The double cone sealing element 108 includes two conically extending sealing surfaces 110, which rest against the circumferential edge 102 and a circumferential edge 112 that encompasses the fuel outlet opening 61 in the contact surface 26. The housing part 22 is tightened against the housing base body 30 by way of screws 69 (FIG. 3) in such a way that the circumferential edges 102 and 112 dig into the conical sealing surfaces 110 of the double cone sealing element 108 and thus produce a high-pressure seal.

The housing part 22 includes a section 66 that protrudes toward the drive shaft 4, is concentric to the cylinder chamber 12, and engages in a radial opening 67 in the housing base body 30. At the transition from the contact surface 26 to the section 66, a centering collar 68 is provided, with which the housing part 22 is positioned in the radial opening 67. As mentioned above, the housing part 22 is tightened against the housing base body 30 in such a way that the contact surface 26 of the housing part 22 and the contact surface 28 of the housing base body 30 rest against each other over a large area and produce a seal of the fuel inlet openings 46 and 47 that are flush with each other. In this manner, when the radial piston pump is assembled, a statically precisely defined position of the housing part 22 on the housing base body 30 is achieved and all of the high-pressure sealing points are thus uncoupled from one another. Since the check valves 48, 62 are accommodated in the radially outer housing part 22, this housing part can be pre-assembled as a subassembly and separately pressure tested.

The sealing of the diametrically widened radially outer end section 31 of the through opening 20 is carried out by the screw-connected sealing element 32, by virtue of the fact that a bead-shaped projection 70, a so-called biting edge, which encompasses the central opening 40 in the disk element 38, is provided on the end face 34 of the sealing element 32, and this projection "digs into" the metal of the disk element 38 when the sealing element 32 is tightened. This presses the disk element 38 with its opposite side against the axial, hard-turned step 36 in such a way that a high-pressure seal is produced here as well.

In a corresponding manner, a biting edge 74 is also embodied on the end face 72 of the high-pressure fitting 64. A screw plug 76, which seals an assembly/access opening to the high-pressure side check valve 62, is tightened with a biting edge against a step.

When the drive shaft 4 rotates out of the position depicted in FIG. 2, the piston 10 is moved out of the cylinder chamber 12 through the action of the compression spring 18. By means of this, the pressure in the cylinder chamber drops and when it falls below an opening pressure, the intake side check valve 48 opens so that fuel is aspirated into the cylinder chamber by way of the inlet opening 46, 44, 42, 40. With the subsequent compression stroke, the check valve 48 closes and the high-pressure side check valve 62 opens so that high-pressure fuel can be delivered to the high-pressure fitting 64 by way of the outlet opening 60, 61, 65.

Figure 5:
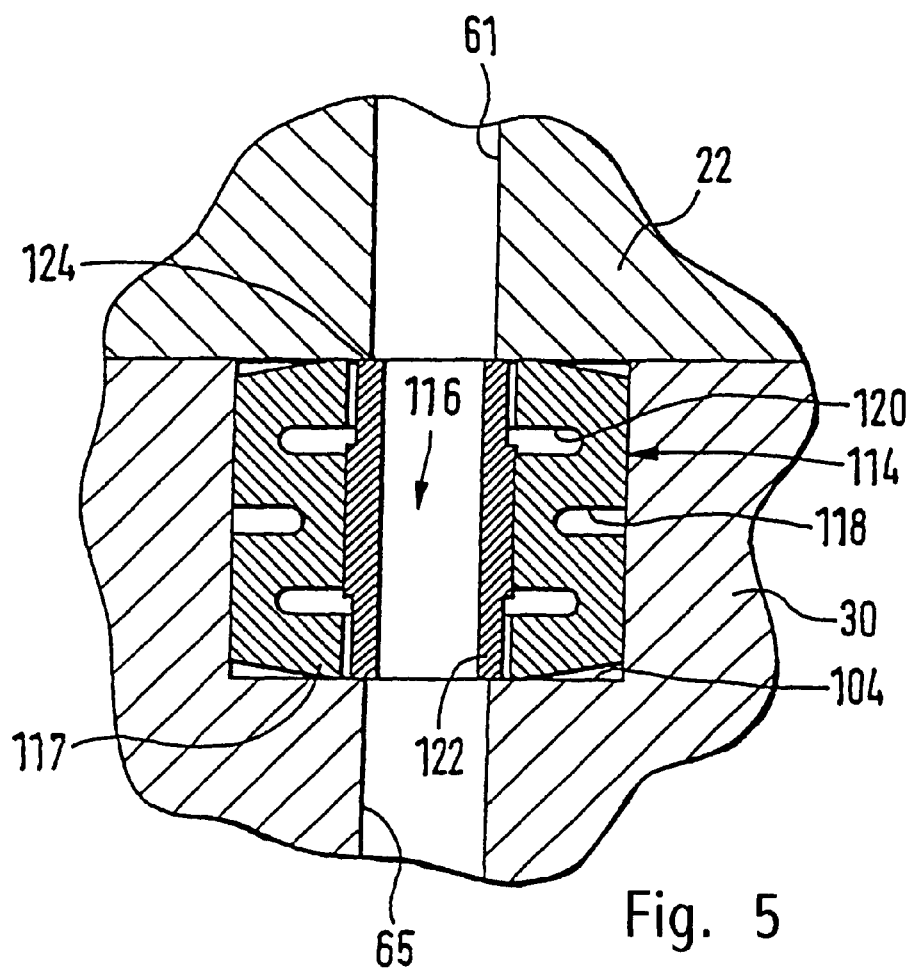
FIGS. 5, 6, 7a, 7b, 7c, 7d and 7e are sectional views of other embodiments of high-pressure sealing points.

FIG. 5 shows another embodiment of a bushing-shaped high-pressure sealing element 114. This high-pressure sealing element 114 is embodied as somewhat resilient, i.e. deformable, in the axial direction 116. It includes an outer and an inner sealing sleeve 117 and 122. Recesses 118 or 120 that extend in the radial direction as well as in the circumference direction are provided on the inner and outer surface of the outer sealing sleeve 117. The inner sealing sleeve 122 is supported with its axial end faces 124 on the one hand, against the contact surface 26 of the housing component 22 and on the other hand, against the axial step 104 of the widened mouth region 100. When the housing part 22 is tightened against the housing base body 30, the inner sleeve and outer sleeve: of the high-pressure sealing element 114 are deformed in the axial direction. This produces a hard metallic seal of the fuel outlet openings 61 and 65 in relation to the outside.

Figure 6:
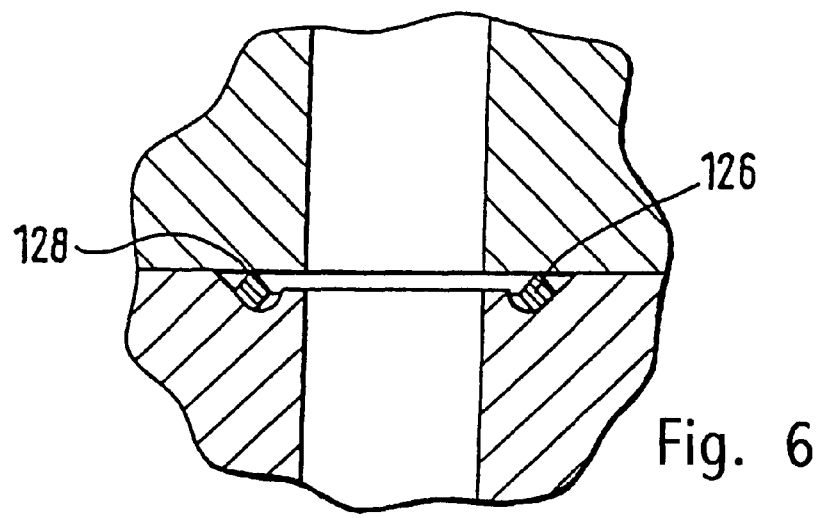
Figure 7A:
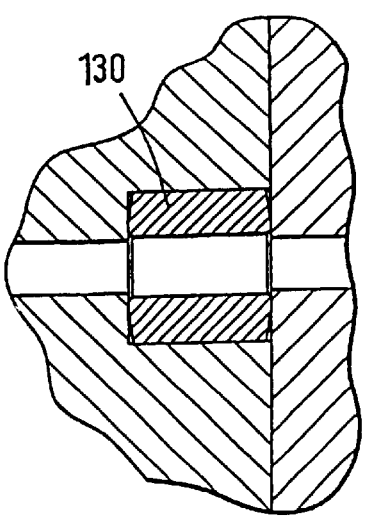
Figure 7B:
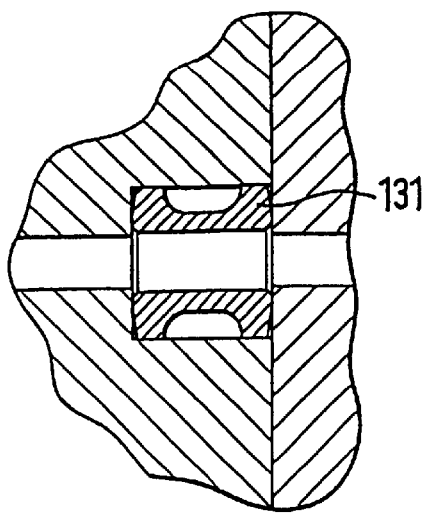
Figure 7C:
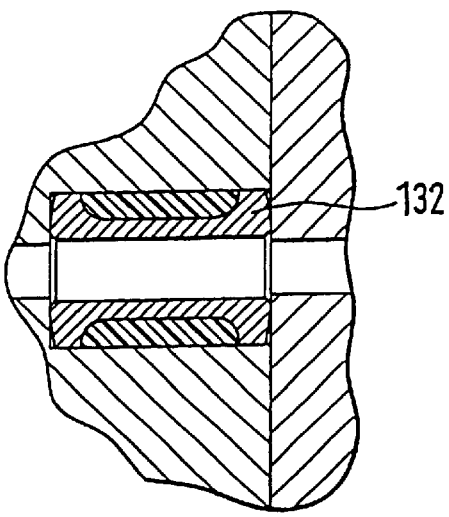
Figure 7D:
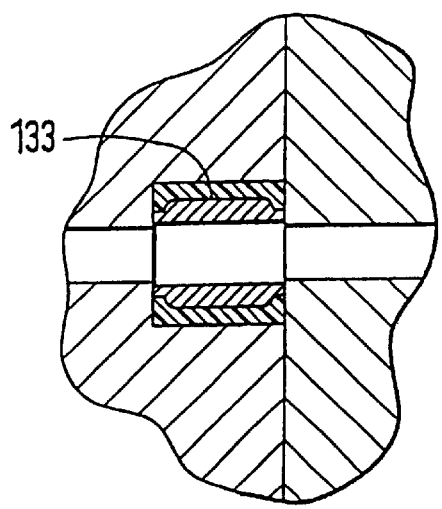
Figure 7E:
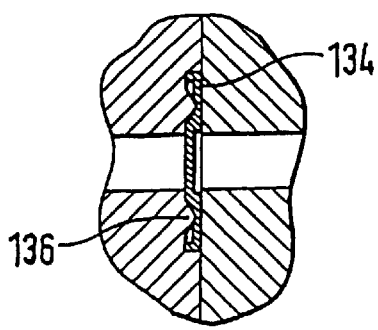

FIG. 6 shows an annular high-pressure sealing element 126, which is embodied as polygonal in cross section and has a sharp, circular sealing edge 128.

FIG. 7 shows other embodiments of bushing-shaped high-pressure sealing elements 130, 131, 132, 133, as well as a disk-shaped high-pressure sealing element 134, the latter of which cooperates with a circumferential, bead-shaped projection 136, which encircles the opening to be sealed.

The foregoing relates to a preferred exemplary embodiment of the invention, it being understood that other variants and embodiments thereof are possible within the spirit and scope of the invention, the latter being defined by the appended claims.

I claim:

1. A radial piston pump for high-pressure fuel delivery in fuel injection systems of internal combustion engines including a common rail injection system, which comprises an eccentric drive shaft (4) that is supported in a pump housing (2), a number of pistons (10) that are disposed radially with regard to the drive shaft, each piston is operative in a respective cylinder chamber (12), and is set into a reciprocating motion in the radial direction in the cylinder chamber upon rotation of the drive shaft (4), said system includes an intake check valve (48) on an intake side and an output check valve (62) on a high-pressure side of said cylinder, wherein for each piston (10), a metallic housing part (22), which constitutes the respective cylinder chamber (12), is provided with first and second fuel intake openings (44, 46) and first and second fuel outlet openings (60, 61), the housing part (22) rests with a flat contact surface (26) against a flat contact surface (28) of a metallic housing base body (30) from a radial outside with regard to the drive shaft (4), said housing part (22) includes a projecting section (66) which is concentric to the cylinder chamber (12) and is oriented toward the drive shaft, said projecting section (66) extends through a radial opening (67) of the housing base body (30) in a direction toward the drive shaft (4), said second fuel outlet opening (61) discharges into the flat contact surface (26) and is flush with a third outlet opening (65) in the housing base body (30), and that in a widened mouth region (100) of the second fuel outlet opening (61) in the housing part (22) and the third outlet opening (65) that is flush with the second outlet opening in the housing base body (30) is provided with a metallic high-pressure sealing element (106, 114, 126, 130–134) which includes end faces, and that the housing part (22), with the interposition of the metallic high-pressure sealing element, is tightened against the housing base body (30) by way of screws (69) in such a way that the high-pressure side is sealed through the clamping of the high-pressure sealing element, with second fuel outlet opening (61), said third outlet opening (65), and said high-pressure sealing element all being coaxial, with the end faces of the high-pressure sealing element providing the sealing function.

2. The radial piston pump according to claim 1, in which the high-pressure sealing element (126) is embodied as annular and includes a sealing edge (128) which cooperates with a flat sealing surface.

3. The radial piston pump according to claim 1, in which the high-pressure sealing element (114, 130–133) is embodied as bushing-shaped and produced a hard seal with its end (124) encompassing the second and third outlet openings (61, 65).

4. The radial piston pump according to claim 3, in which the high-pressure sealing element (114) includes an inner sleeve (122) and an outer sleeve (117).

5. The radial piston pump according to claim 4, in which the bushing-shaped high-pressure sealing element (114, 131, 132) is resilient and embodied in an axial direction.

6. The radial piston pump according to claim 5, in which the bushing-shaped high-pressure sealing element (114, 131, 132) has first and second recesses (118, 120) that extend in a radial direction as well as in a circumferential direction.

7. The radial piston pump according to claim 4, in which a sealing edge is embodied on the end faces of the bushing-shaped high-pressure sealing element (114, 130, 131, 132) and produces a high-pressure seal when the end faces are tightened against each other.

8. The radial piston pump according to claim 3, in which the bushing-shaped high-pressure sealing element (114, 131, 132) is resilient and embodied in an axial direction.

9. The radial piston pump according to claim 8, in which the bushing-shaped high-pressure sealing element (114, 131, 132) has first and second recesses (118, 120) that extend in a radial direction as well as in a circumferential direction.

10. The radial piston pump according to claim 9, in which a sealing edge is embodied on the end faces of the bushing-shaped high-pressure sealing element (114, 130, 131, 132) and produces a high-pressure seal when the end faces are tightened against each other.

11. The radial piston pump according to claim 8, in which a sealing edge is embodied on the end faces of the bushing-shaped high-pressure sealing element (114, 130, 131, 132) and produces a high-pressure seal when the end faces are tightened against each other.

12. The radial piston pump according to claim 3, in which a sealing edge is embodied on the end faces of the bushing-shaped high-pressure sealing element (114, 130, 131, 132) and produces a high-pressure seal when the end faces are tightened against each other.

13. The radial piston pump according to claim 1, in which all high-pressure-affected sealing points of metallic components (22, 30; 32, 38; 64) are tightened against metallic surfaces.

14. The radial piston pump according to claim 1, in which the protruding section (66) of the housing part (22) oriented toward the drive shaft forms a centering collar (68) with which the housing part (22) is positioned in the radial opening (67) of the housing base body (30).

15. The radial piston pump according to claim 1, in which the intake side check valve (48) and the high-pressure side check valve (62) are integrated into the housing part (22).

16. The radial piston pump according to claim 1, in which an edged or bead-shaped circumferential projection (70, 74) is embodied on one of the sealing surfaces of the metallic components (32, 38; 22; 64, 30; 76, 22), which rest against each other, and leads to a high-pressure seal when the components are tightened against each other.

17. A radial piston pump for high-pressure fuel delivery in fuel injection systems of internal combustion engines including a common rail injection system, which comprises an eccentric drive shaft (4) that is supported in a pump housing (2), a number of pistons (10) that are disposed radially with regard to the drive shaft, each piston is operative in a respective cylinder chamber (12), and is set into a reciprocating motion in the radial direction in the cylinder chamber upon rotation of the drive shaft (4), said system includes an intake check valve (48) on an intake side and an output check valve (62) on a high-pressure side of said cylinder, wherein for each piston (10), a metallic housing part (22), which constitutes the respective cylinder chamber (12), is provided with first and second fuel intake openings (44, 46) and first and second fuel outlet openings (60, 61), the housing part (22) rests with a flat contact surface (26) against a flat contact surface (28) of a metallic housing base body (30) from a radial outside with regard to the drive shaft (4), said housing part (22) includes a projecting section (66) which is concentric to the cylinder chamber (12) and is oriented toward the drive shaft, said projecting section (66) extends through a radial opening (67) of the housing base body (30) in a direction toward the drive shaft (4), said second fuel outlet opening (61) discharges into the flat contact surface (26) and is flush with a third outlet opening (65) in the housing base body (30), and that in a widened mouth region (100) of the second fuel outlet opening (61) in the housing part (22) and the third outlet opening (65) that is flush with the second outlet opening in the housing base body (30) is provided with a metallic high-pressure sealing element (106, 114, 126, 130–134) which includes end faces, and that the housing part (22), with the interposition of the metallic high-pressure sealing element, is tightened against the housing base body (30) by way of screws (69) in such a way that the high-pressure side is sealed through the clamping of the high-pressure sealing element, in which the high-pressure sealing element (106) is a double cone sealing element (108) and the housing 22 is tightened against the housing body 30 in such a manner that circumferential edges (102, 112) dig into the double cone sealing element 108 to produce a high-pressure seal.

18. The radial piston pump according to claim 17, in which the respective second and third outlet openings (61, 65) or edges (102, 112), which encompass an opening section of the high-pressure sealing element (106), rest in a sealed fashion against a conical surface (110) of the double cone sealing element (108).

19. A radial piston pump for high-pressure fuel delivery in fuel injection systems of internal combustion engines including a common rail injection system, which comprises an eccentric drive shaft (4) that is supported in a pump housing (2), a number of pistons (10) that are disposed radially with regard to the drive shaft, each piston is operative in a respective cylinder chamber (12), and is set into a reciprocating motion in the radial direction in the cylinder chamber upon rotation of the drive shaft (4), said system includes an intake check valve (48) on an intake side and an output check valve (62) on a high-pressure side of said cylinder, wherein for each piston (10), a metallic housing part (22), which constitutes the respective cylinder chamber (12), is provided with first and second fuel intake openings (44, 46) and first and second fuel outlet openings (60, 61), the housing part (22) rests with a flat contact surface (26) against a flat contact surface (28) of a metallic housing base body (30) from a radial outside with regard to the drive shaft (4), said housing part (22) includes a projecting section (66) which is concentric to the cylinder chamber (12) and is oriented toward the drive shaft, said projecting section (66) extends through a radial opening (67) of the housing base body (30) in a direction toward the drive shaft (4), said second fuel outlet opening (61) discharges into the flat contact surface (26) and is flush with a third outlet opening (65) in the housing base body (30), and that in a widened mouth region (100) of the second fuel outlet opening (61) in the housing part (22) and the third outlet opening (65) that is flush with the second outlet opening in the housing base body (30) is provided with a metallic high-pressure sealing element (106, 114, 126, 130–134) which includes end faces, and that the housing part (22), with the interposition of the metallic high-pressure sealing element, is tightened against the housing base body (30) by way of screws (69) in such a way that the high-pressure side is sealed through the clamping of the high-pressure sealing element, in which the housing part (30) has a through opening (20) that extends radially in relation to the drive shaft (4), said through opening (20) constitutes the cylinder chamber (12), and is sealed radially from the outside by a metallic sealing element (32) that is screwed into the through opening (20).

20. The radial piston pump according to claim 19, in which the metallic sealing element (32) is tightened with an end face (34) against an axial step (36) in the through opening (20) in such a way that a high-pressure-tight seal is produced.

21. The radial piston pump according to claim 20, in which an edged or bead-shaped circumferential projection (70) is embodied on the end face (34) of the sealing element (32) and leads to a high-pressure seal when the components are tightened against each other.

* * * * *